(12) United States Patent
Ha

(10) Patent No.: US 9,891,706 B2
(45) Date of Patent: Feb. 13, 2018

(54) MOBILE TERMINAL AND CONTROL METHOD THEROF

(71) Applicant: LG ELECTRONICS INC., Seoul (KR)

(72) Inventor: Kilho Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/489,080

(22) Filed: Sep. 17, 2014

(65) Prior Publication Data
US 2015/0091794 A1   Apr. 2, 2015

(30) Foreign Application Priority Data
Oct. 2, 2013 (KR) .................. 10-2013-0117825

(51) Int. Cl.
*G06F 3/01* (2006.01)
*H04M 1/725* (2006.01)

(52) U.S. Cl.
CPC ........ *G06F 3/013* (2013.01); *H04M 1/72522* (2013.01); *H04M 2250/52* (2013.01)

(58) Field of Classification Search
None
See application file for complete search history.

(56) References Cited

U.S. PATENT DOCUMENTS

| 9,313,409 | B2* | 4/2016 | Kim .................. H04N 5/2628 |
| 9,621,818 | B2* | 4/2017 | Jung ................. H04N 5/2258 |
| 2006/0044396 | A1* | 3/2006 | Miyashita ........... H04N 5/2252 348/207.99 |
| 2008/0068487 | A1* | 3/2008 | Morita ................ G03B 13/00 348/333.05 |
| 2008/0165195 | A1* | 7/2008 | Rosenberg ............ G06T 13/40 345/473 |
| 2008/0240563 | A1* | 10/2008 | Takano .............. H04N 5/23219 382/173 |
| 2008/0252745 | A1* | 10/2008 | Nakamura ........... H04N 5/232 348/222.1 |
| 2010/0254609 | A1* | 10/2010 | Chen ................ G06K 9/00221 382/195 |
| 2011/0033092 | A1* | 2/2011 | Lee .................. G06K 9/00228 382/118 |
| 2011/0128223 | A1* | 6/2011 | Lashina .............. G06F 3/013 345/158 |
| 2012/0008011 | A1* | 1/2012 | Garcia Manchado . G03B 15/08 348/231.2 |
| 2012/0019662 | A1* | 1/2012 | Maltz ................ G06F 3/013 348/158 |
| 2012/0218431 | A1* | 8/2012 | Matsuoto ........... H04N 5/2258 348/218.1 |

(Continued)

*Primary Examiner* — Nicholas Lee
*Assistant Examiner* — Benjamin Casarez
(74) *Attorney, Agent, or Firm* — Birch, Stewart, Kolasch & Birch, LLP

(57) ABSTRACT

A mobile terminal including a wireless communication unit configured to provide wireless communication; a camera configured to obtain an image of at least one user; a display configured to display the image obtained by the camera; and a controller configured to extract a gaze direction of the at least one user from the captured image, and display a guide image for guiding the gaze direction based on the extracted gaze direction on the display unit in proximate relationship with the camera.

22 Claims, 13 Drawing Sheets

(56) References Cited

U.S. PATENT DOCUMENTS

| | | | |
|---|---|---|---|
| 2012/0281101 A1* | 11/2012 | Fujinawa | H04N 1/00127 348/207.1 |
| 2013/0076945 A1* | 3/2013 | Nagata | H04N 5/23296 348/240.2 |
| 2013/0095924 A1* | 4/2013 | Geisner | A63F 13/00 463/32 |
| 2013/0147980 A1* | 6/2013 | Gardenfors | H04N 5/23219 348/222.1 |
| 2014/0118600 A1* | 5/2014 | Son | H04N 5/23293 348/333.11 |
| 2014/0146202 A1* | 5/2014 | Boss | H04N 5/23229 348/231.99 |
| 2015/0109507 A1* | 4/2015 | Li | H04N 5/23293 348/333.01 |
| 2015/0206354 A1* | 7/2015 | Shibuhisa | H04N 5/23219 348/46 |
| 2015/0304549 A1* | 10/2015 | Lee | G06K 9/00308 348/211.4 |
| 2016/0323503 A1* | 11/2016 | Wada | H04M 1/72522 |

* cited by examiner (a)

(b)

MOBILE TERMINAL AND CONTROL METHOD THEROF

CROSS-REFERENCE TO RELATED APPLICATIONS

Pursuant to 35 U.S.C. §119(a), this application claims the benefit of earlier filing date and right of priority to Korean Patent Application No. 10-2013-0117825, filed on Oct. 2, 2013, the contents of which are incorporated by reference herein in their entirety.

DISCUSSION OF THE BACKGROUND

Field of the Invention

The present invention relates to a mobile terminal and corresponding method for capturing a high-quality portrait of a user by correctly guiding a gaze direction of the user being captured.

Description of the Related Art

Terminals have become multimedia players with multiple functions such as capturing pictures or moving images, playing music, displaying moving image files and playing games and receiving broadcasting programs. Terminals can be categorized as mobile terminals and stationary terminals. The mobile terminals can be further classified into handheld terminals and vehicle mounted terminals according.

However, the camera included with the terminals has limited capabilities and often is cumbersome for the user to use, especially because of the small sized display included in most terminals.

SUMMARY OF THE INVENTION

Accordingly, an object of the present invention is to address the above-noted and other problems.

Another object of the present invention is to provide a novel mobile terminal and corresponding method for capturing a high-quality portrait of a user by correctly guiding a gaze direction of the user being captured.

To achieve these and other advantages and in accordance with the purpose of the present invention, as embodied and broadly described herein, the present invention provides in one aspect a mobile terminal including a wireless communication unit configured to provide wireless communication; a camera configured to obtain an image of at least one user; a display configured to display the image obtained by the camera; and a controller configured to extract a gaze direction of the at least one user from the captured image, and display a guide image for guiding the gaze direction based on the extracted gaze direction on the display unit in proximate relationship with the camera.

In another aspect, the present invention provides a method of controlling a mobile terminal, and which includes obtaining, via a camera of the mobile terminal, an image of at least one user; displaying, via a display of the mobile terminal, the image obtained by the camera; extracting, via a controller of the mobile terminal, a gaze direction of the at least one user from the captured image; and displaying a guide image for guiding the gaze direction based on the extracted gaze direction on the display unit in proximate relationship with the camera.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Reference will now be made in detail to the preferred embodiments of the present invention, examples of which are illustrated in the accompanying drawings.

In the following description, suffixes "module" and "unit" may be given to components of the mobile terminal in consideration of only facilitation of description and do not have meanings or functions discriminated from each other. The mobile terminal may include a cellular phone, a smart phone, a laptop computer, a digital broadcasting terminal, personal digital assistants (PDA), a portable multimedia player (PMP), a navigation system and/or so on.

Figure 1:
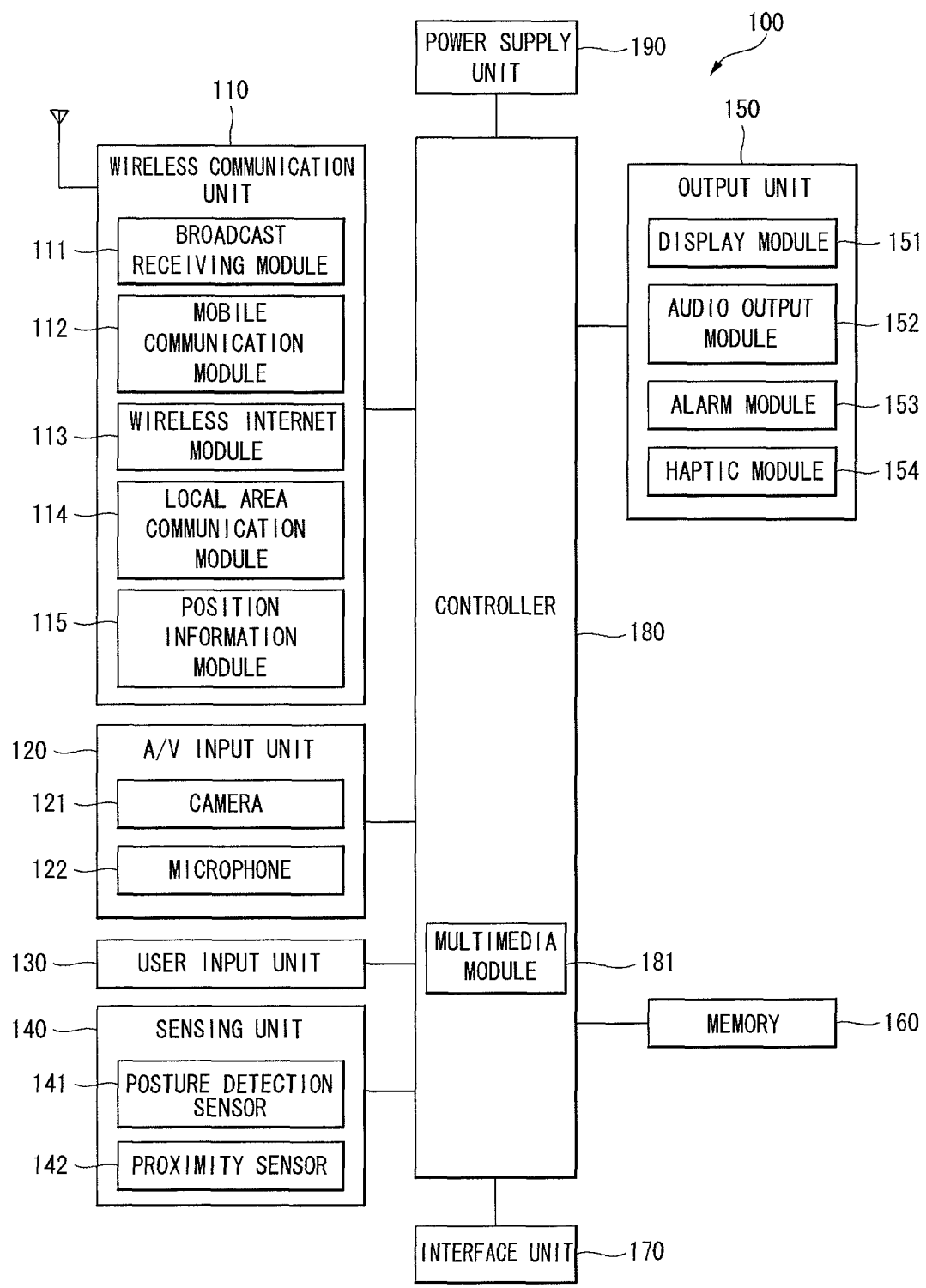
FIG. 1 is a block diagram of a mobile terminal according to an embodiment.

FIG. 1 is a block diagram of a mobile terminal according to an embodiment. Other embodiments, configurations and arrangements may also be provided. As shown, the mobile terminal 100 may include a wireless communication unit 110 (or radio communication unit), an audio/video (AN) input unit 120, a user input unit 130, a sensing unit 140, an output unit 150, a memory 160, an interface 170, a controller 180, and a power supply 190. The components shown in FIG. 1 may vary.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, BLUETOOTH®, radio frequency identification (RFID), infrared data association (IrDA), ultra wideband (UWB) and/or ZIGBEE® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 can sense whether the power supply 190 supplies power and/or whether the interface 170 is connected to an external device. The sensing unit 140 may also include a posture detection sensor 141 and a proximity sensor 142. The sensing unit 140 can sense a motion of the mobile terminal 100.

The output unit 150 can generate visual, auditory and/or tactile output, and the output unit 150 may include the display 151, an audio output module 152, an alarm 153 and a haptic module 154. The display 151 can display information processed by the mobile terminal 100. The display 151 can display a user interface (UI) and/or a graphic user interface (GUI) related to a telephone call when the mobile terminal 100 is in the call mode. The display 151 can also display a captured and/or received image, a UI or a GUI when the mobile terminal 100 is in the video telephony mode or the photographing mode.

The display 151 can include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user can see an object located behind the body (of the mobile terminal 100) through the transparent area of the body of the mobile terminal 100 that is occupied by the display 151.

The mobile terminal 100 can also include at least two displays 151. For example, the mobile terminal 100 can include a plurality of displays 151 that are arranged on a single face at a predetermined distance or integrated displays. The plurality of displays 151 can also be arranged on different sides.

When the display 151 and a sensor sensing touch (hereafter referred to as a touch sensor) form a layered structure that is referred to as a touch screen, the display 151 can be used as an input device in addition to an output device. The touch sensor may be in the form of a touch film, a touch sheet, and/or a touch pad, for example.

The touch sensor can convert a variation in pressure applied to a specific portion of the display 151 or a variation in capacitance generated at a specific portion of the display 151 into an electric input signal. The touch sensor can sense pressure of touch as well as position and area of the touch.

When the user applies a touch input to the touch sensor, a signal corresponding to the touch input can be transmitted to a touch controller. The touch controller can then process the signal and transmit data corresponding to the processed signal to the controller 180. Accordingly, the controller 180 can detect a touched portion of the display 151.

The proximity sensor 142 (of the sensing unit 140) may be located in an internal region of the mobile terminal 100, surrounded by the touch screen, and/or near the touch screen. The proximity sensor 142 can sense an object approaching a predetermined sensing face or an object located near the proximity sensor 142 using an electromagnetic force or infrared rays without having mechanical contact. The proximity sensor 142 can have a lifetime longer than a contact sensor and can thus have a wide application in the mobile terminal 100.

The proximity sensor 142 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 142.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 142 can sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 can output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 can output sounds through an earphone jack. The user can thus hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 can also output signals in forms different from video signals or audio signals, for example, a signal for indicating generation of an event through vibration. The video signals and/or the audio signals may also be output through the display 151 or the audio output module 152.

The haptic module 154 can generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 can generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 can store a program for operations of the controller 180 and/or temporarily store input/output data such as a phone book, messages, still images, and/or moving images. The memory 160 can also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 can serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 can also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 can control overall operations of the mobile terminal 100. For example, the controller 180 can perform control and processing for voice communication, data communication and/or video telephony. The controller 180 can also include a multimedia module 181 for playing multimedia. The multimedia module 181 may be included in the controller 180 or may be separated from the controller 180.

The controller 180 can perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to a hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to a software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
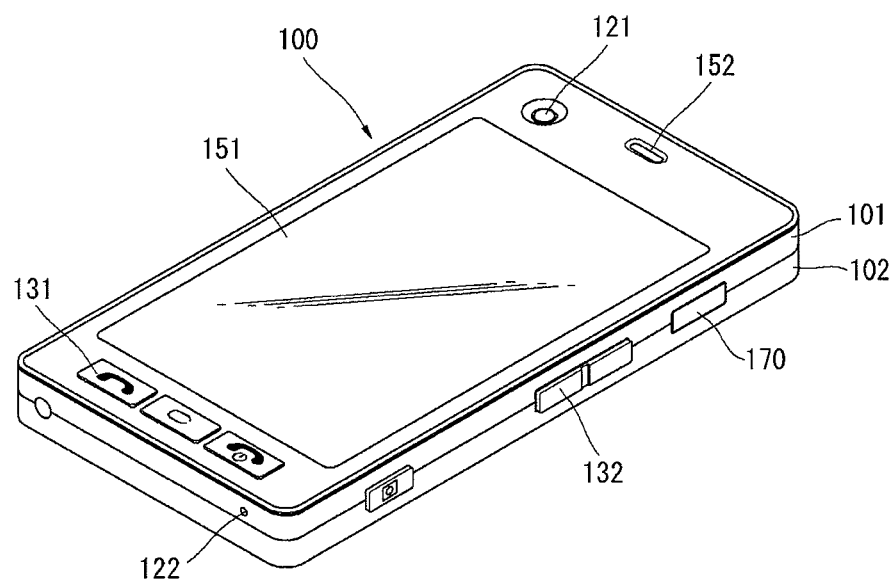
FIG. 2A is a front perspective view of the mobile terminal according to an embodiment.

Next, FIG. 2A is a front perspective view of a mobile terminal (or a handheld terminal) according to an embodiment. The mobile terminal 100 may be a bar type terminal body. However, embodiments are not limited to a bar type terminal and can be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102. The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 can receive commands for controlling operation of the mobile terminal 100, and include a plurality of operating units 131 and 132. The operating units 131 and 132 can be referred to as manipulating portions and employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
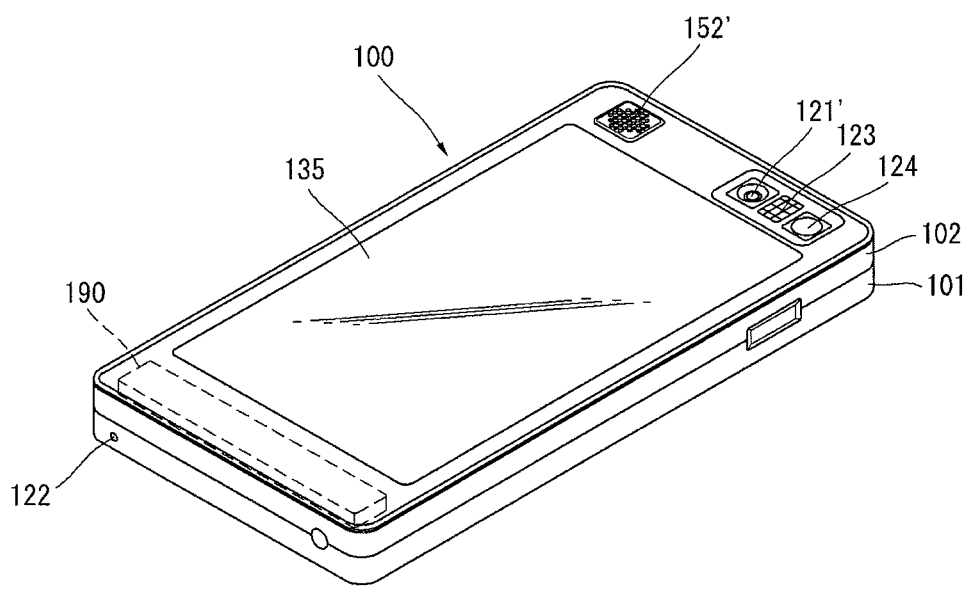
FIG. 2B is a rear perspective view of the mobile terminal according to an embodiment.

Next, FIG. 2B is a rear perspective view of the mobile terminal 100 shown in FIG. 2A according to an embodiment. Referring to FIG. 2B, a camera 121' may be additionally attached to the rear side of the terminal body (i.e., the rear case 102). The camera 121' may have a photographing direction opposite to that of the camera 121 and may have pixels different from those of the camera 121.

For example, it may be desirable that the camera 121 has low pixels such that the camera 121 can capture an image of a face of a user and transmit the image to a receiving part when video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 3:
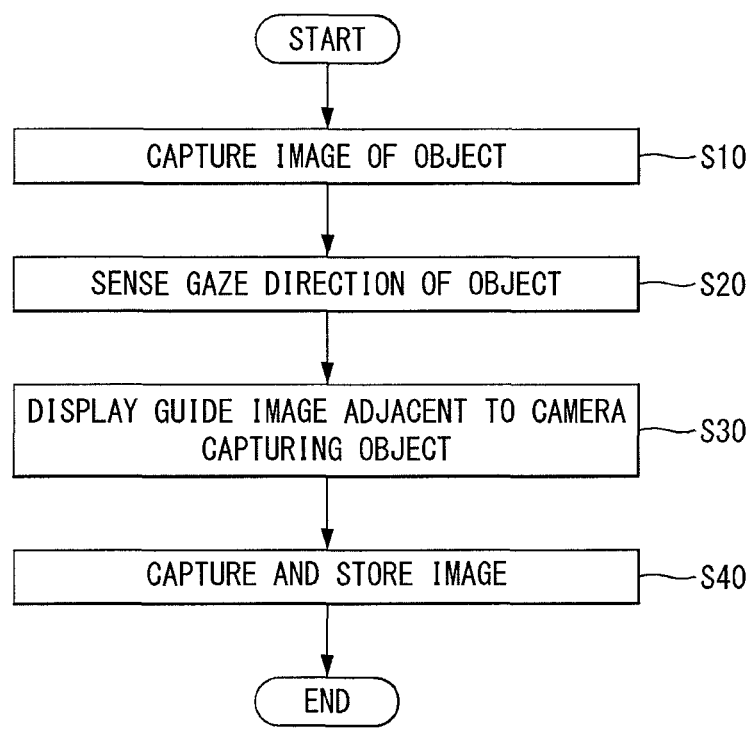
FIGS. 3 and 4 are flowcharts illustrating operations of the mobile terminal shown in FIG. 1.
Figure 4:
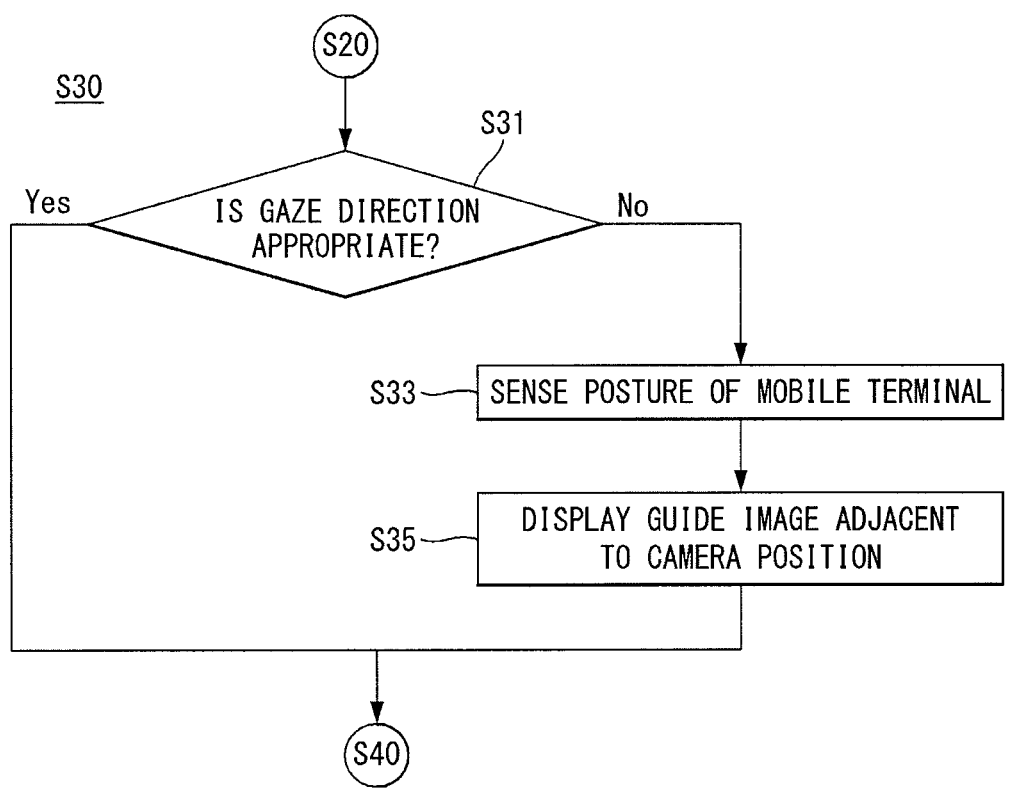

Next, FIGS. 3 and 4 are flowcharts illustrating operations of the mobile terminal 100 shown in FIG. 1. Referring to FIG. 3, the controller 180 captures an image of an object in step S10. The object may be a target captured using the mobile terminal 100 by a user such as a person. For example, the object may be a user of the mobile terminal 100 or at least one person around the mobile terminal 100.

An image of the object can be captured through the cameras 121 and 121' of the mobile terminal 100. For example, the user of the mobile terminal 100 can capture an image of himself using the camera 121' provided to the backside of the mobile terminal 100 or capture images of other people using the camera 121 provided to the front of the mobile terminal 100.

The controller 180 then senses a gaze direction of the object (S20). In more detail, when the object is a person, the face of the person is captured in general. When the face of the person is captured, the captured image includes an eye image of the person. In this instance, a gaze direction of the person can be sensed based on the direction of the pupils of the person.

Further, the controller 180 displays a guide image in proximity to the position of the camera capturing the object (S30) and captures and stores an image of the object (S40). The controller 180 can display the guide image used to capture the object in an optimized state. Thus, the guide image can guide the object, that is, a person to be suited to capturing. For example, the guide image can guide the person to gaze at the camera 121 such that the person gazing at the camera 121 is captured.

The controller 180 can display the guide image in proximity to the position of the camera 121. That is, the controller 180 can display the guide image in an area of the display 151, which is close to the camera 121. When the guide image is displayed in proximity to the camera 121, the person corresponding to the object can gaze at the camera 121 by viewing the guide image. Accordingly, a more natural image can be captured. The captured image can then be stored in the memory 160.

Referring to FIG. 4, the step S30 of displaying the guide image in proximity to the camera capturing the object includes determining whether the gaze direction of the person is appropriate (S31). The gaze direction can be sensed through analysis of an eye image of the person, which is included in the captured image.

When the gaze direction is appropriate (Yes in S31), the controller 180 can capture and store the image (S40). When the gaze direction is not appropriate (No in S31), the posture of the mobile terminal 100 is detected (S33). The mobile terminal 100 can perform image capture in a portrait or landscape direction according to how the user grips the mobile terminal 100. That is, an image is captured in portrait or landscape mode.

The mobile terminal 100 can thus detect the posture thereof based on a result of the sensing unit 140 including the posture detection sensor 141, and display the guide image in proximity to the position of the camera 121 (S35).

The position of the camera 121 attached to the mobile terminal 100 is determined in the manufacturing stage. For example, the camera may be positioned at the upper portion of the right side of the front of the mobile terminal 100 when the user grips the mobile terminal 100 in the portrait direction, and positioned at the lower portion of the right side of the front of the mobile terminal 100 when the user holds the mobile terminal 100 in the landscape direction.

The controller 180 can determine the position of the guide image based on the current grip direction of the mobile terminal 100. That is, the guide image can be displayed at the lower portion of the right side of the display 151 when the mobile terminal 100 is held in the portrait direction and at the lower portion of the right side of the display 151 when the mobile terminal 100 is held in the landscape direction. Since the position of the guide image can be determined based on the direction in which the mobile terminal grip is oriented, the guide image can be displayed adjacent to the position of the camera 121.

Figure 5:
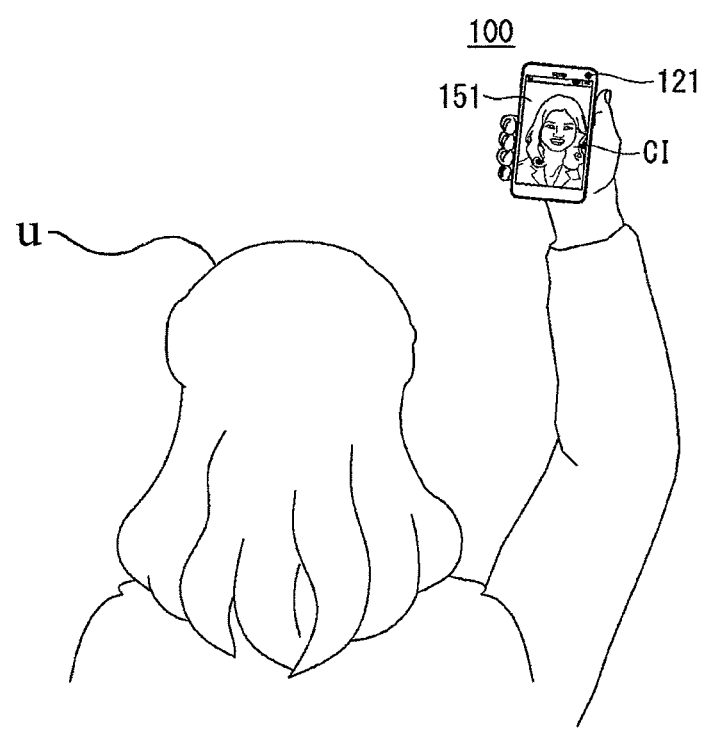
FIGS. 5 to 7 are overviews illustrating the operation of the mobile terminal shown in FIG. 4.
Figure 6:
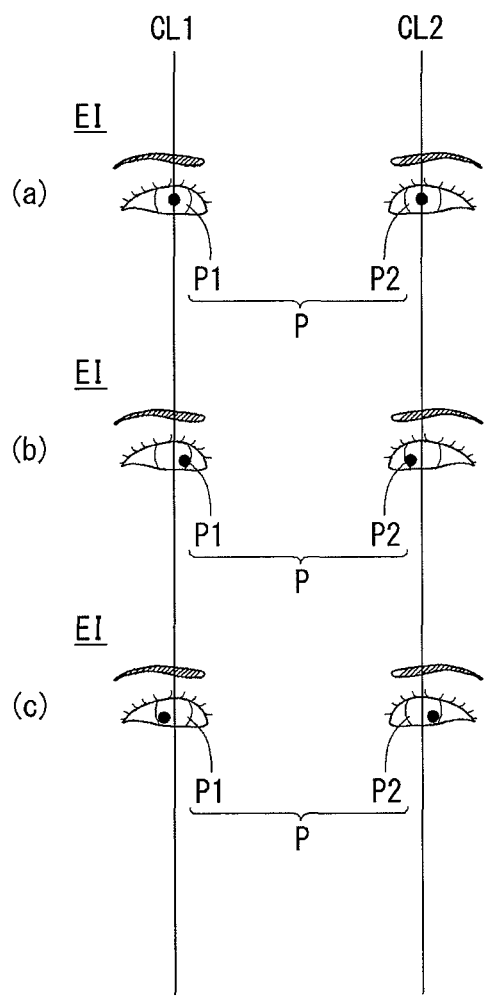
Figure 7:
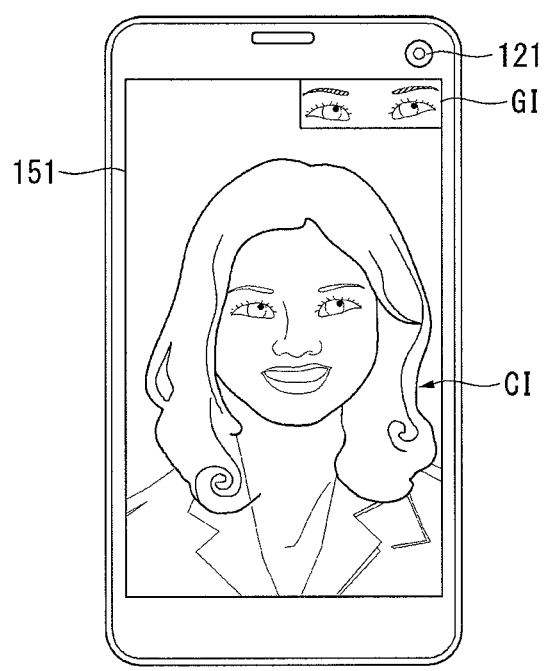

Next, FIGS. 5 to 7 illustrate the operation of the mobile terminal shown in FIG. 4 in which the mobile terminal 100 captures an image of a user U in a satisfactory pose by guiding a gaze direction of the user.

Referring to FIG. 5, the user U can grip the mobile terminal 100 and capture a self image. The user U can also grip the mobile terminal 100 in portrait mode. In this instance, the camera 121 is positioned at the upper portion of the right side of the mobile terminal 100.

The controller 180 can display, on the display 151, an image being captured through the camera 121. For example, a user image CI can be displayed in the form of a preview. The controller 180 can determine a gaze direction of the user based on the captured user image CI. For example, the controller 180 can determine the gaze direction by analyzing a captured eye image.

As shown in FIG. 6, the gaze direction of the user can be determined based on first and second centerlines CL1 and CL2 and the positions of first and second pupils P1 and P2. Referring to FIG. 6(a), the controller 180 can extract an eye image EI from the captured image and extract an image of the first and second pupils P1 and P2 corresponding to the left and right eyes from the eye image EI.

The positions of the first and second pupils P1 and P2 may be compared with the first and second virtual centerlines CL1 and CL2. When the positions of the first and second pupils P1 and P2 are located on the first and second centerlines CL1 and CL2, the controller 180 can determine that the person being captured gazes at the camera 121.

Referring to FIG. 6(b) and (c), the positions of the first and second pupils P1 and P2 may deviate in a direction from the first and second centerlines CL1 and CL2 as a result of analysis of the eye image EI. In this instance, the controller 180 can determine that the person being captured does not gaze at the camera 121.

Referring to FIG. 7, upon determining that the gaze direction of the user is not appropriate as a result of analysis of the captured user image CI, the controller 180 can display the guide image GI. The guide image GI can be displayed in proximity to the camera 121 capturing the user image CI.

Further, the controller 180 can not display the guide image GI when the gaze direction of the user is appropriate, and rather display the guide image GI when the gaze direction of the user is not appropriate. When the guide image GI is displayed, the user unconsciously or subconsciously gazes at the guide image GI. Thus, because the guide image GI is displayed in proximity to the camera 121, the user can naturally gaze at the camera 121 while viewing the guide image GI.

In addition, when the user gazes at the camera 121, the controller 180 can determine that the gaze direction of the user is appropriate for capture. The controller 180 can thus capture an image of the user upon determining that the gaze direction of the user is appropriate for capture.

FIGS. 8 to 12 illustrate the operation of the mobile terminal, shown in FIG. 4, according to other embodiments of the present invention. That is, the mobile terminal 100 can display the guide image GI in an appropriate manner.

Figure 8:
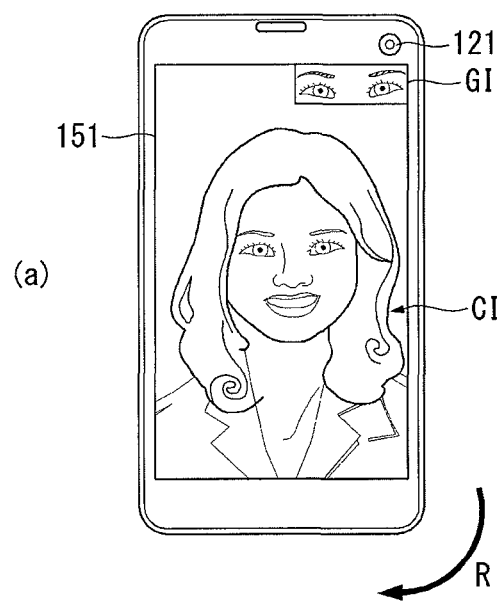
FIGS. 8 to 12 are overviews illustrating the operation of the mobile terminal shown in FIG. 4 according to another embodiment of the present invention.
Figure 8:
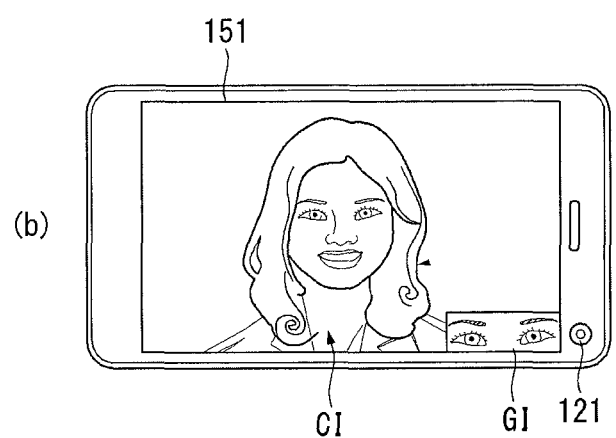

Referring to FIG. 8(*a*), the mobile terminal 100 can capture an image in portrait mode. When the user of the mobile terminal 100 captures an image of themselves, the image can be captured using the camera 121 provided to the front of the mobile terminal 100.

When the mobile terminal 100 is gripped by the user in the portrait direction and the camera 121 is positioned at the upper portion of the right side of the bezel of the mobile terminal 100, the controller 180 can display the guide image GI on the upper portion of the right side of the display 151. In this instance, the user sees the guide image GI displayed on the upper portion of the right side of the display 151 and thus naturally gazes at the camera 121. When the user gazes at the camera 121, a more natural image can be captured.

Referring to FIG. 8(*b*), the mobile terminal 100 can be rotated to the landscape state. In this instance, the position of the camera 121 is changed to the lower portion of the right side of the display 151. Thus, the controller 180 can change the position of the guide image GI according to rotation of the mobile terminal 100. For example, upon detection of a clockwise rotation of the mobile terminal 100 in the portrait mode, the controller 180 can display the guide image GI at the lower portion of the right side of the display 151 in the landscape mode such that the guide image GI corresponds to the position of the camera 121.

In addition, upon detection of counter clockwise rotation of the mobile terminal 100 in the portrait mode, the controller 180 can display the guide image GI on the upper portion of the left side of the display 151 in the landscape mode such that the guide image GI corresponds to the position of the camera 121.

Figure 9:
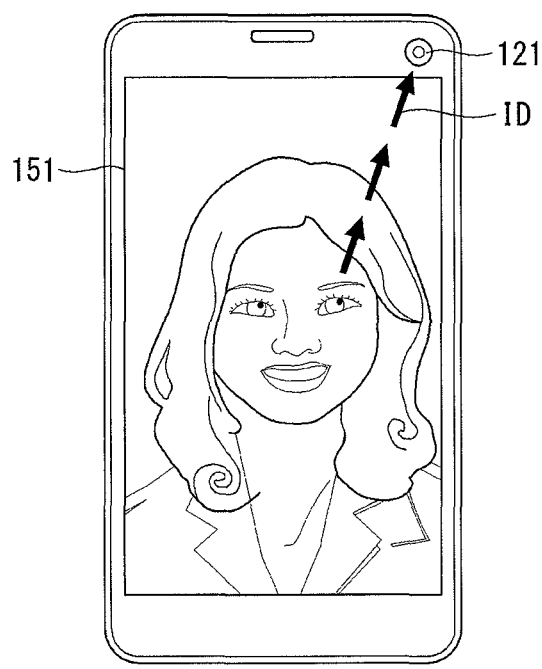

Referring to FIG. 9, the controller 180 can represent the guide image GI as an indicator ID indicating the direction of the camera 121. The indicator ID may be displayed on the display 151 when the gaze direction of the user is not appropriate for capturing. That is, the controller 180 can not display the indicator ID when the gaze direction is appropriate and display the indicator ID when the gaze direction is not appropriate.

Further, the indicator ID may take the form of an arrow. The arrow-shaped indicator ID can thus direct the user's attention to the position of the camera 121. When the user gazes at the camera 121 upon re-recognition of the position of the camera 121 owing to the indicator ID, the controller 180 can capture an image of the user. That is, image capture can be automatically performed without receiving additional user input.

Figure 10:
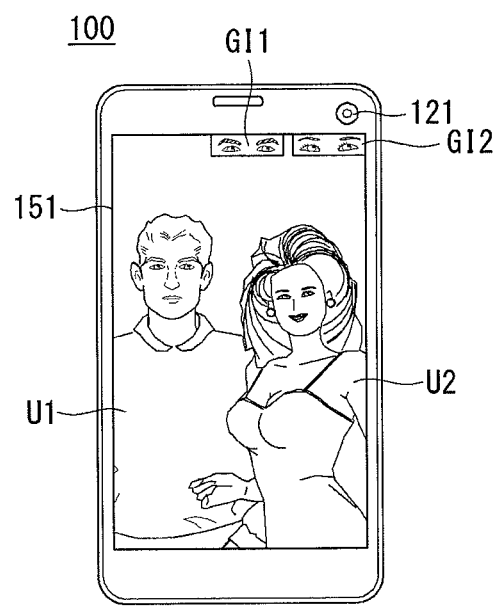
Figure 10:
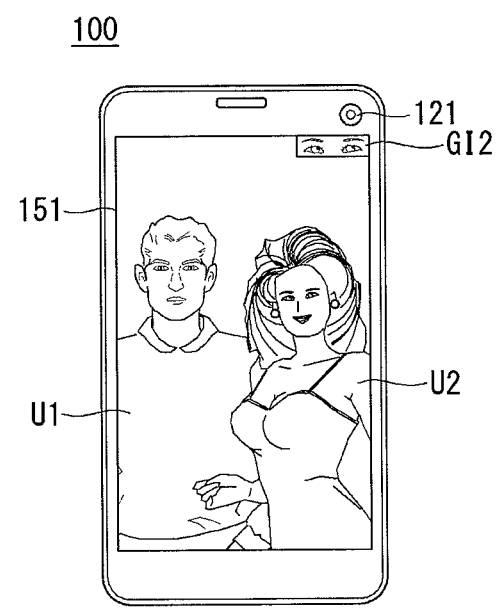

As shown in FIG. 10, the controller 180 of the mobile terminal 100 according to an embodiment of the present invention can effectively display the guide image GI even when an image of a plurality of persons is captured. Referring to FIG. 10(*a*), an image of a plurality of users U1 and U2 is captured. Further, the controller 180 can sense gaze directions of the respective users U1 and U2 while the image of the users U1 and U2 is captured. When the gaze directions of the users U1 and U2 are not appropriate for capture, the controller 180 can display a plurality of guide images GI1 and GI2 respectively corresponding to the users U1 and U2. The guide images GI1 and GI2 can be displayed adjacent to the camera 121.

Referring to FIG. 10(*b*), the gaze direction of one of the users U1 and U2 may not be appropriate. The controller 180 can display a guide image only for the corresponding user. For example, the gaze direction of the second user U2 is not appropriate while the gaze direction of the first user U1 is appropriate. The controller 180 can display the second guide image GI2 for the second user U2 in proximity to the camera 121.

Figure 11:
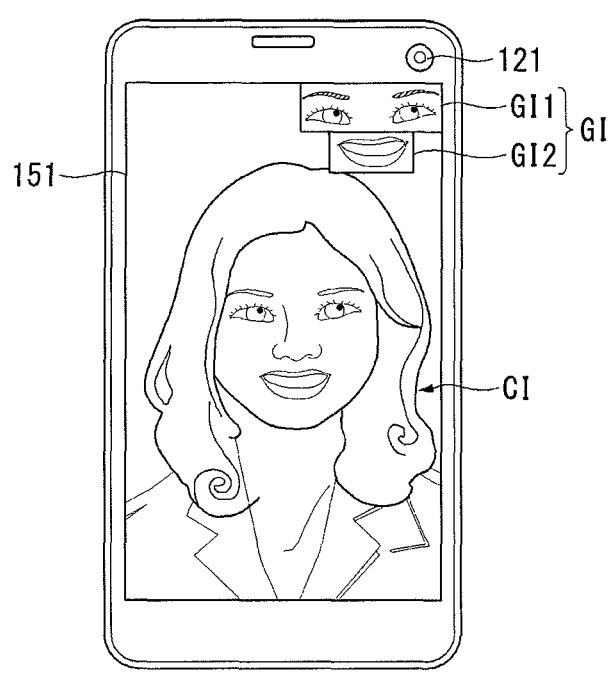

Referring to FIG. 11, the controller 180 of the mobile terminal 100 according to an embodiment of the present invention can provide a guide image with respect to a mouth shape of a person being captured. The guide image GI may include a first guide image GI1 and a second guide image GI2. The first guide image GI1 may be a guide image based on the gaze direction of the user, whereas the second guide image GI2 may be a guide image based on a mouth shape of the user. For example, it may be desirable that the user smile during image capture. In this instance, the controller 180 can display the second guide image GI2 indicating that the mouth shape of the user is not appropriate.

Figure 12:
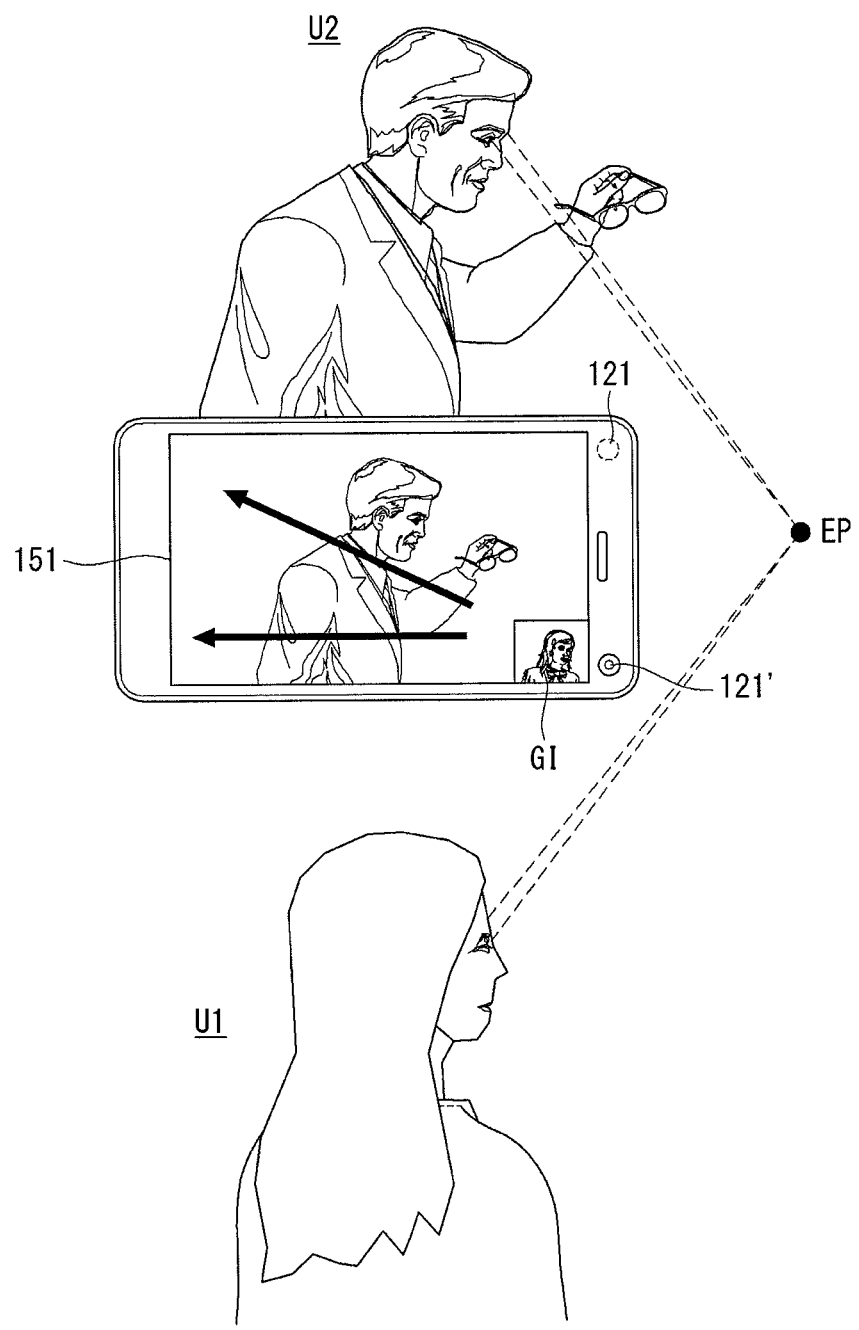

Referring to FIG. 12, when images of a plurality of users U1 and U2 are captured using a plurality of cameras 121 and 121', the guide image GI can be displayed. As discussed previously, the mobile terminal 100 may be equipped with the front camera 121' and the rear camera 121. Thus, the first user U1 and the second user U2 can be simultaneously captured through the front camera 121' and the rear camera 121, respectively. The simultaneously captured images may be stored together.

The controller 180 can guide the first and second users U1 and U2 to gaze in the same direction. For example, the second user U2 may gaze at a specific point EP. The controller 180 can sense the gaze direction of the second user U2 through analysis of the captured images. Upon detection of the gaze direction of the second user U2, the controller 180 can display the guide image GL to guide the first user U1 to gaze in the same direction.

The controller 180 can display the guide image GI in a different position according to the gaze direction of the second user U2. For example, when the specific point EP is moved from right to left, the guide image GI may be displayed at the left of the display 151. The controller 180 can display the guide image GI only when the first user U1 and the second user U2 do not gaze at the same point. That is, the controller 180 can display the guide image GI in order to get the attention of the first user U1 who does not gaze at an appropriate point.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A mobile terminal, comprising:
   a wireless communication unit configured to provide wireless communication;
   a front camera and a rear camera;
   a display configured to display a first preview image or a second preview image obtained by the front or rear cameras, respectively; and
   a controller configured to:
   display the first preview image on the display,
   extract body parts from a subject within the first preview image and set the extracted body parts as a guide image, wherein the first preview image includes more body parts of the subject than a number of body parts included in the guide image and the extracted body parts are based on at least eyes and a mouth shape of the subject within the first preview image,
   in response to a user movement, transition from displaying the first preview image on the display to displaying the guide image on the first preview image without overlapping a face of the subject on the display adjacent to a position of the front camera for guiding a gaze direction towards the front camera, wherein the guide image is a partial portion of the first preview image,
   change a position of the guide image on the display in response to a rotation of the mobile terminal to be adjacent to the position of the front camera while continuing to display the guide image on the first preview image in an overlapping manner,
   simultaneously capture the first preview image of a first user through the front camera and the second preview image of a second user through the rear camera,
   determine a gaze direction of the second user, and
   display the guide image extracted from the first p review image overlapping the second preview image to guide a gaze of the first user in a same direction as the gaze direction of the second user.

2. The mobile terminal of claim 1, wherein the front camera is provided at one side of a bezel of the mobile terminal.

3. The mobile terminal of claim 1, wherein the controller is further configured to display the guide image only when the gaze direction of at least one user deviates from a predetermined reference.

4. The mobile terminal of claim 1, further comprising:
   a position sensor configured to sense a posture of the mobile terminal,
   wherein the controller is further configured to change and display the guide image according to the posture sensed through the position sensor.

5. The mobile terminal of claim 4, wherein when the mobile terminal is held in a portrait mode and the front camera is disposed above the display in a bezel region, the controller is further configured to display the guide image in an upper portion of the display in proximate relationship with the front camera, and when the mobile terminal is changed to a landscape mode, the controller is further configured to display the guide image in a side portion of the display in proximate relationship with the front camera.

6. The mobile terminal of claim 1, wherein an indicator graphic image is displayed on the first preview image and includes at least one graphic arrow pointing toward a location of the camera to direct a user to gaze at the front camera.

7. The mobile terminal of claim 1, wherein the guide image includes only a first image of the first user's eyes and a second image of only the user's mouth, and
   wherein the first image is adjacent to the second image without any image of the first user's nose between the first and second images.

8. The mobile terminal of claim 1, wherein the controller is further configured to capture an image of at least one user when the gaze direction of the at least one user corresponds to a direction toward the front camera.

9. The mobile terminal of claim 1, wherein when the first preview image includes a plurality of users, the controller is further configured to display the guide image corresponding to a user who does not gaze at the front camera.

10. The mobile terminal of claim 1, wherein when the first preview image includes a plurality of users, the controller is further configured to display a plurality of guide images corresponding to the plurality of users.

11. The mobile terminal of claim 1, wherein the rotation changes an orientation of the mobile terminal from a portrait direction to a landscape direction or from the landscape direction to the portrait direction.

12. A method of controlling a mobile terminal, the method comprising:

obtaining, via a front camera of the mobile terminal, a first preview image;
obtaining, via a rear camera of the mobile terminal, a second preview image;
displaying, via a display of the mobile terminal, the first preview image;
extracting body parts from a subject within the first preview image;
setting the extracted body parts as a guide image, wherein the first preview image includes more body parts of the subject than a number of body parts included in the guide image and the extracted body parts are based on at least eyes and a mouth shape of the subject within the first preview image;
in response to a user movement, transitioning from displaying the first preview image on the display to displaying the guide image on the first preview image without overlapping a lace of the subject on the display adjacent to a position of the front camera for guiding a gaze direction towards the front camera, wherein the guide image is a partial portion of the first preview image;
changing a position of the guide image on the display in response to a rotation of the mobile terminal to be adjacent to the position of the front camera while continuing to display the guide image on the first preview image in an overlapping manner;
simultaneously capturing a the first preview image of a first user through the front camera and the second preview image of a second user through the rear camera;
determining a gaze direction of the second user; and
displaying the guide image extracted from the first preview image overlapping the second preview image to guide a gaze of the first user in a same direction as the gaze direction of the second user.

13. The method of claim 12, wherein the front camera is provided at one side of a bezel of the mobile terminal.

14. The method of claim 12, further comprising:
displaying the guide image only when the gaze direction of at least one user deviates from a predetermined reference.

15. The method of claim 12, further comprising:
sensing, via a position sensor of the mobile terminal, a posture of the mobile terminal; and
changing and displaying the guide image according to the posture sensed through the position sensor.

16. The method of claim 15, wherein when the mobile terminal is held in a portrait mode and the front camera is disposed above the display in a bezel region, the method further comprises displaying the guide image in an upper portion of the display in proximate relationship with the front camera, and when the mobile terminal is changed to a landscape mode, displaying the guide image in a side portion of the display in proximate relationship with the front camera.

17. The method of claim 12, wherein an indicator graphic image is displayed on the first preview image and includes at least one graphic arrow pointing toward a location of the camera to direct a user to gaze at the front camera.

18. The method of claim 12, wherein the guide image includes only a first image of the first user's eyes and a second image of only the user's mouth, and
wherein the first image is adjacent to the second image without any image of the first user's nose between the first and second images.

19. The method of claim 12, further comprising:
capturing the image of at least one user when the gaze direction of the at least one user corresponds to a direction toward the front camera.

20. The mobile terminal of claim 12, wherein when the first preview image includes a plurality of users, the method further comprises displaying the guide image corresponding to a user who does not gaze at the camera.

21. The mobile terminal of claim 12, wherein when the first preview image includes a plurality of users, the method further comprises displaying a plurality of guide images corresponding to the plurality of users.

22. The method claim 12, wherein the rotation changes an orientation of the mobile terminal from a portrait direction to a landscape direction or from the landscape direction to the portrait direction.

\* \* \* \* \*